United States Patent
Holcomb et al.

(10) Patent No.: US 8,287,177 B2
(45) Date of Patent: Oct. 16, 2012

(54) COCKTAIL MIXER WITH ROTATABLE TOP

(75) Inventors: David A. Holcomb, Seattle, WA (US);
Joshua R. Stewart, Seattle, WA (US);
Matthew Krus, Seattle, WA (US)

(73) Assignee: Chef'n Corporation, Seattle, WA (US)

( * ) Notice: Subject to any disclaimer, the term of this patent is extended or adjusted under 35 U.S.C. 154(b) by 410 days.

(21) Appl. No.: 12/504,357

(22) Filed: Jul. 16, 2009

(65) Prior Publication Data
US 2010/0012659 A1 Jan. 21, 2010

Related U.S. Application Data

(60) Provisional application No. 61/081,257, filed on Jul. 16, 2008, provisional application No. 61/083,113, filed on Jul. 23, 2008.

(51) Int. Cl.
*B01F 13/00* (2006.01)

(52) U.S. Cl. ........ 366/130; 366/219; 220/502; 220/212; 220/254.1; 206/219

(58) Field of Classification Search ................. 215/230, 215/228, 387, DIG. 8; 220/212, 810, 831–833, 220/254.1, 254.3, 254.5, 254.7, 256.1, 259.1, 220/568; 366/130, 142, 219; 206/219, 221
See application file for complete search history.

(56) References Cited

U.S. PATENT DOCUMENTS

| | | | | |
|---|---|---|---|---|
| 1,765,129 A * | 6/1930 | Cooke | ........................... | 220/568 |
| 2,013,616 A * | 9/1935 | Rettenmeyer | ................. | 220/568 |
| 2,090,998 A * | 8/1937 | Gessler | ........................... | 40/324 |
| 2,577,976 A * | 12/1951 | Mortrude | ....................... | 366/130 |
| 2,595,985 A * | 5/1952 | Schwaneke | ................... | 416/203 |
| 2,627,184 A | 2/1953 | Jones | | |
| 3,266,653 A | 8/1966 | Gauthier | | |
| 3,779,372 A * | 12/1973 | de Lloret | ....................... | 206/222 |
| 5,078,289 A * | 1/1992 | Bolton et al. | .................. | 215/228 |
| 5,509,582 A | 4/1996 | Robbins, III | | |
| 5,618,106 A | 4/1997 | Madera | | |
| 6,159,513 A * | 12/2000 | Judlowe et al. | ............... | 426/115 |
| 6,200,015 B1 * | 3/2001 | Gartz et al. | ................... | 366/256 |
| 6,202,542 B1 | 3/2001 | Melton | | |
| D498,966 S * | 11/2004 | Fiedeler et al. | ............. | D7/300.1 |
| 6,913,165 B2 * | 7/2005 | Linz et al. | ....................... | 220/568 |
| 7,866,183 B2 * | 1/2011 | Roth et al. | ..................... | 62/457.3 |
| 7,959,346 B2 * | 6/2011 | Loden | ........................... | 366/130 |
| 2004/0066705 A1 * | 4/2004 | Linz et al. | ........................ | 366/130 |
| 2004/0124102 A1 * | 7/2004 | Chalmers | ....................... | 206/216 |
| 2008/0277424 A1 * | 11/2008 | Larimer et al. | ........... | 222/189.07 |

FOREIGN PATENT DOCUMENTS

FR 757412 12/1933
WO 93/11049 A1 6/1993

* cited by examiner

*Primary Examiner* — Mickey Yu
*Assistant Examiner* — Kareen Rush
(74) *Attorney, Agent, or Firm* — Seed IP Law Group PLLC (57) ABSTRACT

A rotatable top for use with a container for measuring, mixing, and dispensing drinks. The rotatable top rotates around an axis and provides multiple positions for (i) measuring volumes of liquid and dumping that liquid into the container, (ii) inserting additional liquid, ice or other solids into the container, (iii) closing and sealing the top and container for mixing the drink, and (iv) dispensing the mixed drink with or without a strainer.

9 Claims, 14 Drawing Sheets

COCKTAIL MIXER WITH ROTATABLE TOP

CROSS-REFERENCE TO RELATED APPLICATIONS

This application claims the benefit under 35 U.S.C. §119(e) of U.S. Provisional Patent Application Nos. 61/081,257 filed Jul. 16, 2008 and 61/083,113 filed on Jul. 23, 2008. These two provisional applications are incorporated herein by reference in their entireties.

BACKGROUND

1. Technical Field

The present invention relates to a mixing and dispensing container having a top with multiple positions used to measure, mix and dispense cocktails or other drinks.

2. Description of the Related Art

Cocktails and other drinks typically require mixing several ingredients together, including ice and various liquids. For example, a bartender may mix in a container several liquids of various volumes together with ice or other solids, after which the mixed drink is poured into a glass. Generally, it is preferable to have a precise measurement of the various liquids included in a mixed drink, as many mixed drinks require specific ratios of alcohol, other flavored liquids or solids for a distinctive taste. Those preparing mixed drinks therefore usually have a separate measuring device for measuring volumes of the various liquids put into the mixed drink. It is also generally preferable to separate the solids such as ice from the mixed liquids when serving the mixed drink to prevent both splashing of the ice or solids when the mixed drink is poured and dilution of the taste of the mixed drink. Sometimes, however, it is desirable to pour and serve the ice or other solids along with the mixed drink.

There are many cocktail shakers and other mixing devices that have been patented and are on the market, but none of them offer the combined functionality of a cocktail mixer with a single rotatable top having a volume measuring position, a straining position, an open position and a closed position. Instead, typical prior art containers require assembling several pieces to form a container and lid assembly to measure, mix, and strain a beverage.

BRIEF SUMMARY

Generally, the present invention is directed to a device for measuring, mixing and dispensing beverages. In particular, the present invention is a rotatable top having multiple positions that facilitate the measuring of one or more ingredients, mixing those ingredient(s) with ice or other solids, and then dispensing the mixture with or without the ice or other solids.

The present invention is also directed to a container that is generally comprised of a container portion and a rotatable top secured thereto. Preferably, the top and container portions of the receptacle are removably coupled together to form one device.

In embodiments, the top portion is configured to be a unitary body that rotates about an axis to several positions. The several positions of the rotatable top may include (i) a measuring position providing a graduated measuring cup for measuring ingredients such as liquids for a drink, (ii) a closed position for dumping the ingredients into the container from the measuring cup and for providing a closed container when mixing ingredients without substantial leaking or spilling, (iii) a straining position for dispensing the mixed drink while substantially straining the ice or other solids, and (iv) an open position for dispensing the mixed drink, ice or solids without straining and for adding other ingredients to the mixed drink without using the measuring position. In embodiments of the present invention, the container is a means for containing and mixing a drink and the rotatable top is a means for providing rotatable measuring, mixing and dispensing positions along a single axis.

The inventive rotatable top, when combined with a container, allows a person to scoop ice or other solids or liquids into the container when the top is in the open position, measure precise volumes of liquid when the top is in the measuring position, mix the drink by moving or shaking the container and top in a horizontal, circular or other similar fashion when the top is in the closed position, dispense the mixed drink and substantially strain the ice or other solids when the top is in the staining position, and dispense the mixed drink, ice, or other solids when the lid is in the open position. Moreover, the present invention alleviates the need to assemble several pieces used for measuring, mixing and dispensing mixed drinks with conventional cocktail shakers, providing even an unskilled person the tools to make a mixed drink with precise ingredients and dispense only desired ice or other solids with a single container and rotatable top.

In some embodiments, the present invention provides a drink mixing receptacle having a container with a closed distal end and an open proximate end and a rotatable apparatus removably coupled to the proximate end of the container. In some embodiments, the rotatable apparatus comprises a measuring chamber with graduated volume indicators for measuring a liquid volume, a dispensing portion having a perforated area for dispensing a liquid, and a rotatable coupling configured to allow a user to rotate the rotatable apparatus between the measuring chamber and the dispensing portion.

DETAILED DESCRIPTION

Figure 1:
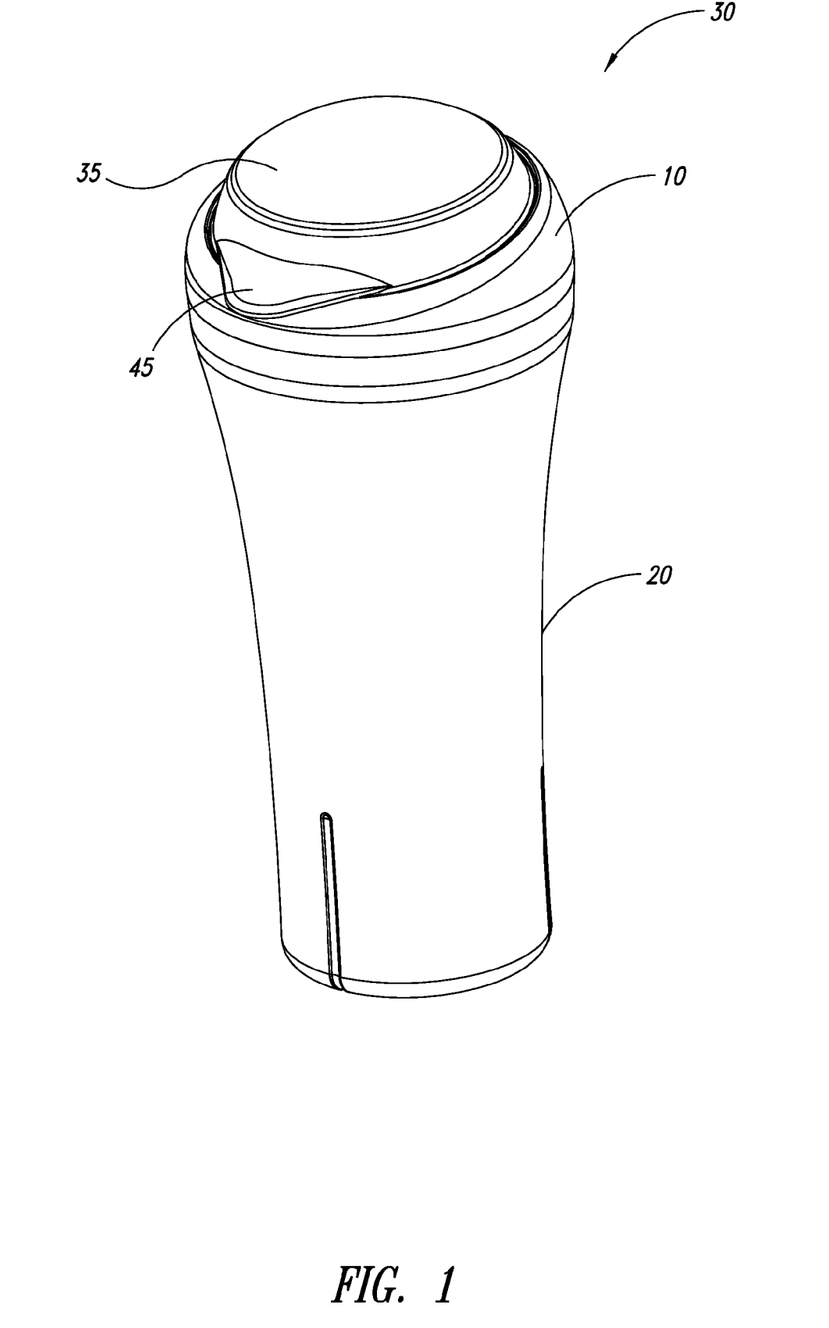
FIG. 1 is a perspective view of a beverage maker according to an embodiment of the invention.
Figure 2:
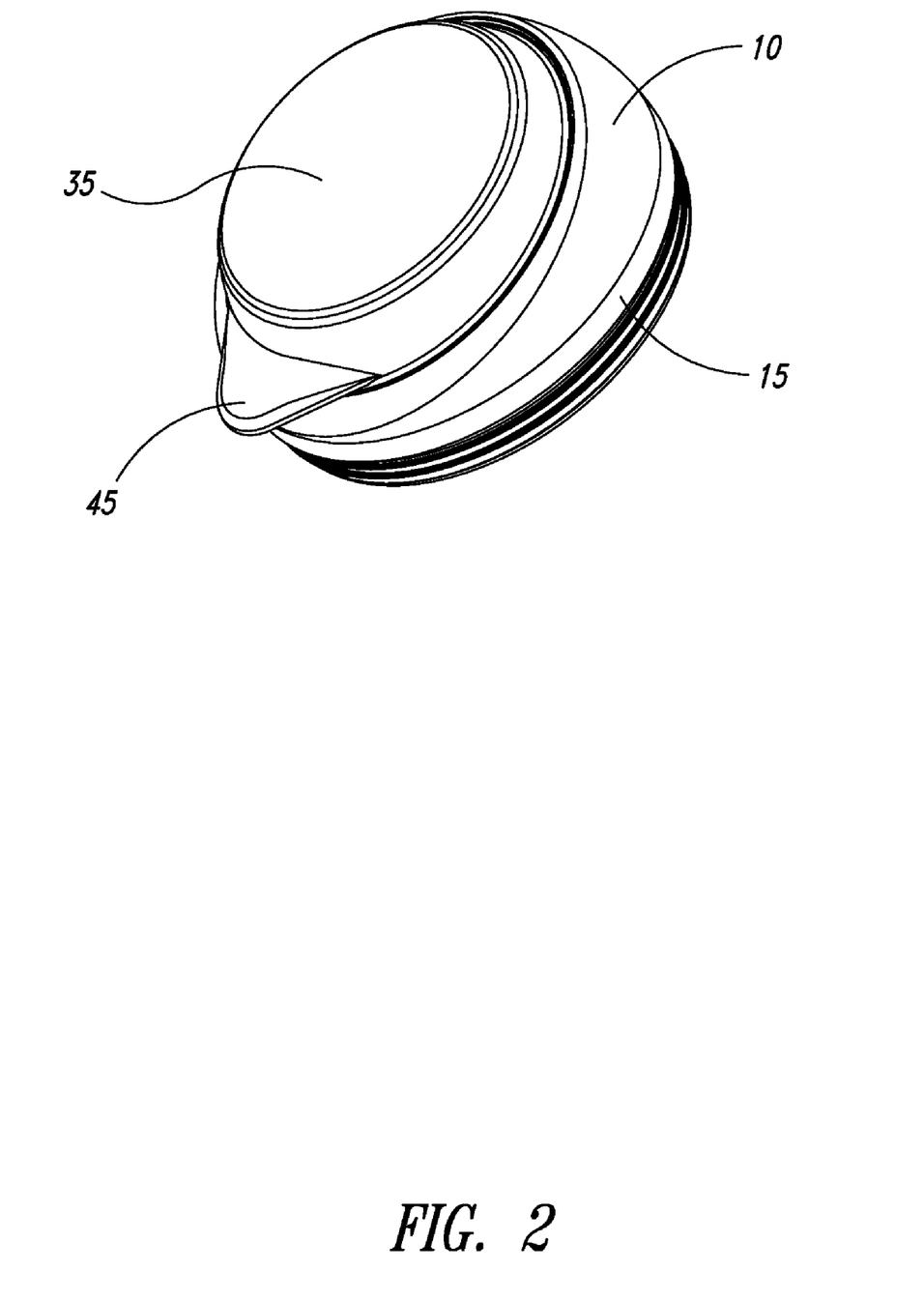
FIG. 2 is a perspective view of a rotatable top according to an embodiment of the invention.
Figure 3:
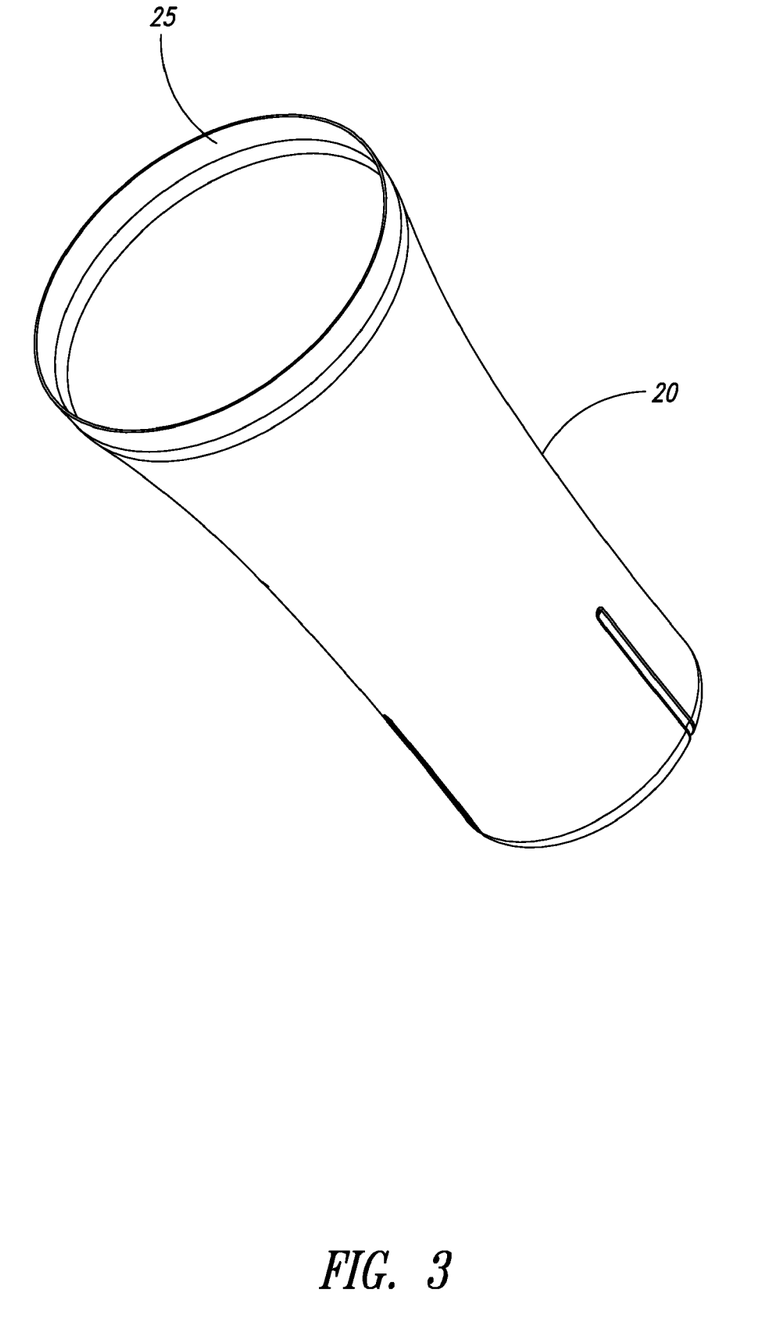
FIG. 3 is a perspective view of a container according to an embodiment of the invention.

Referring generally to FIGS. 1-3, a measuring, mixing and dispensing device 30, also referred to as a "cocktail mixer," includes a rotatable top 10 removably coupled to a container 20. The rotatable top 10 includes a container gasket 15 around a lower portion of the rotatable top 10, where the container gasket 15 is configured to fit snugly inside an inside upper portion 25 of the container 20. The rotatable top 10 and the container 20 combine to form the cocktail mixer 30, with the container gasket 15 providing a seal that substantially prevents liquid from escaping between the rotatable top 10 and the container 20. The rotatable top 10 can be rotated by a user applying force to a lip portion 45 on the rotatable top 10.

The container 20 and rotatable top 10 may be made of any material suitable for a drinking apparatus, such as various plastics and metals or combinations thereof. Any gasket material or combination of materials suitable for use with a beverage container may be used as container gasket 15 as long as the gasket material provides a seal between and snugly holds together the rotatable top 10 and container 20. In some embodiments, container gasket 15 is not present. For example, in an embodiment, rotatable top 10 and container 20 comprise a unitary body or are sealed together without a gasket. In an alternative embodiment, rotatable top 10 is screwed onto container 20 by a screw closure. For example, mating threads may be used in place of the container gasket 15, with threads on the bottom portion of the rotatable top 10 and complementary threads on the inside top portion of the container 20 for securing the container 20 and rotatable top 10 and providing a seal therebetween. In other alternative embodiments, the rotatable top 10 is secured to the container 20 by one or more hinges, such as a hinge secured to corresponding portions of the rotatable top 10 and container 20 for opening, closing, and securing the rotatable top 10 to the container 20. In another alternative embodiment, the rotatable top 10 is secured to the container by a protruding ridge on a portion of the rotatable top 10 that couples to and mechanically fits with a corresponding groove or cutout on the container 20, or vice-versa. The various means for securing the container 20 and rotatable top 10 are means for coupling.

Figure 4A:
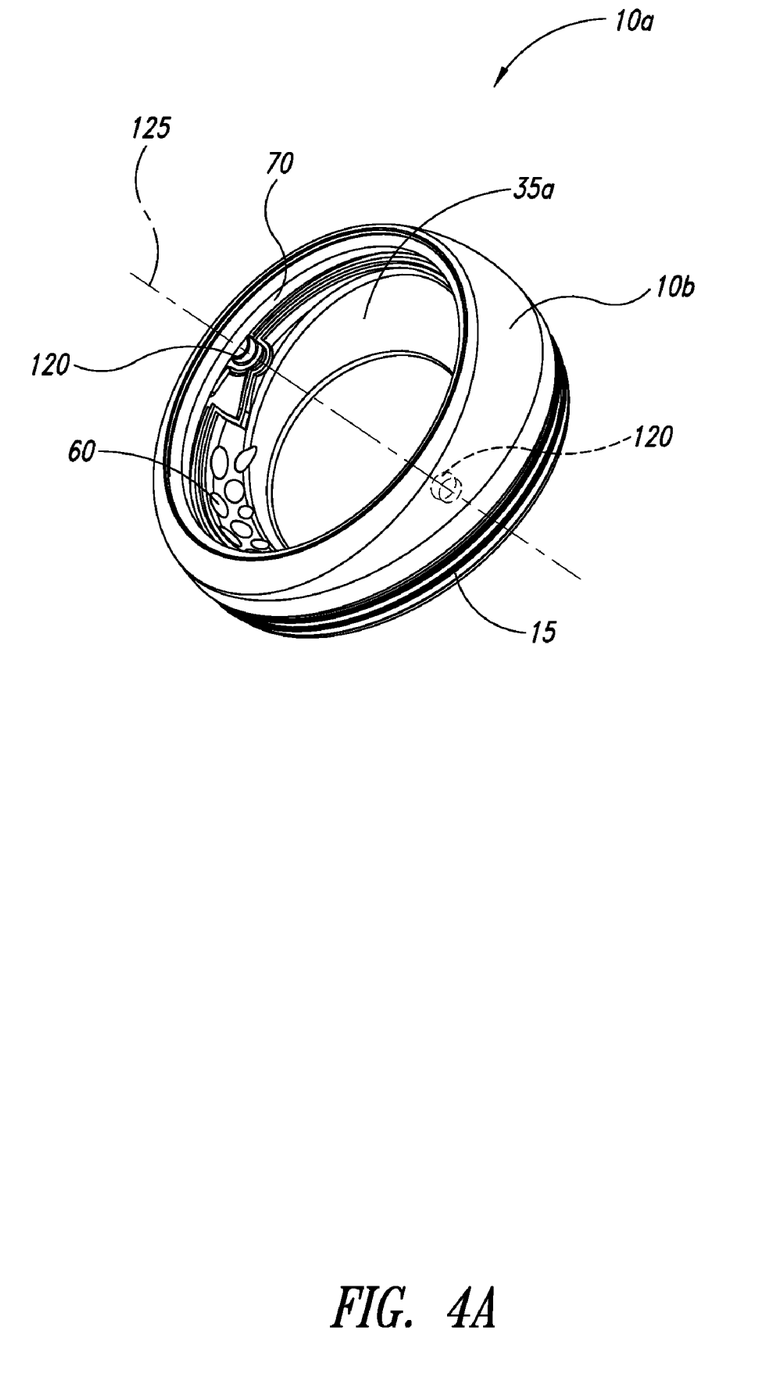
FIG. 4A is a perspective view of a portion of the rotatable top according to an embodiment of the invention.
Figure 4B:
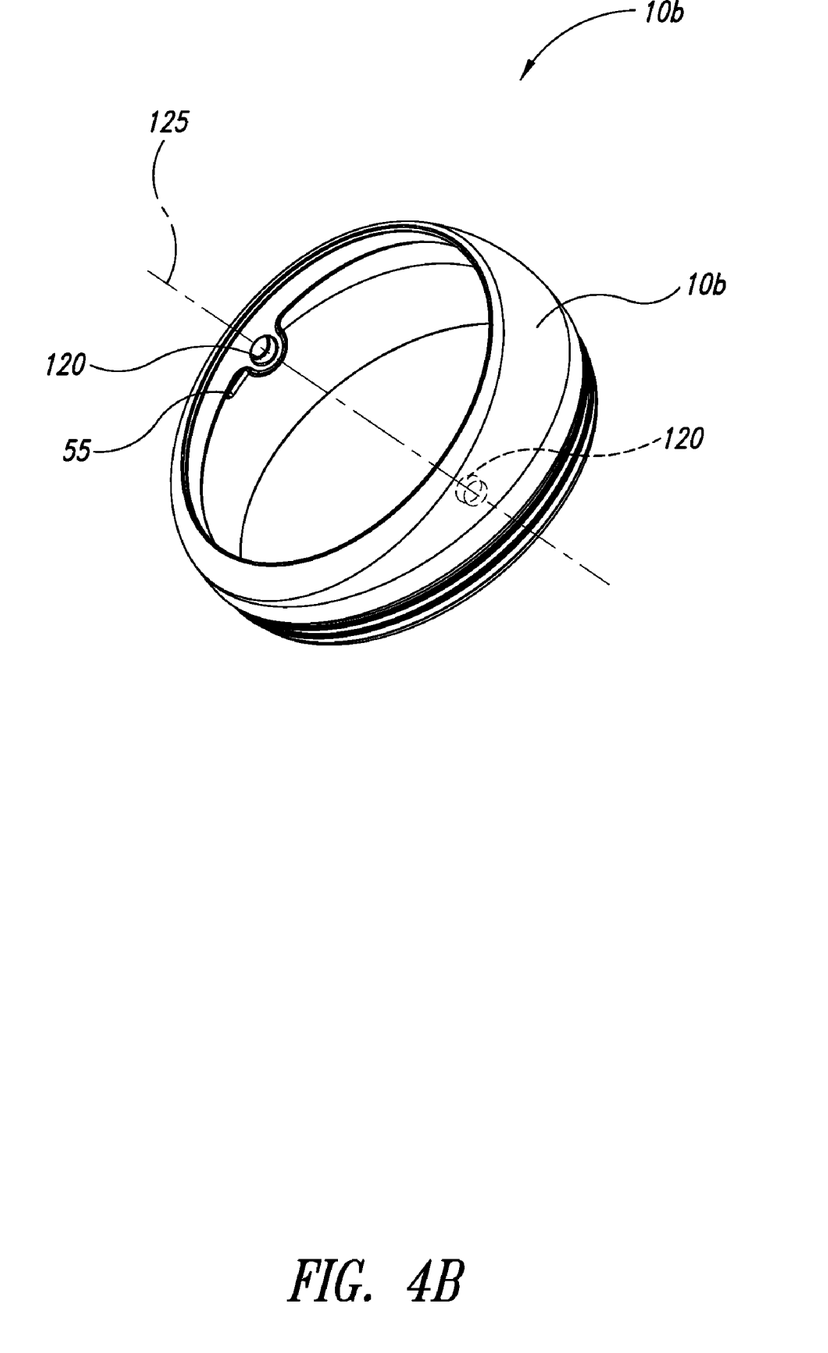
FIG. 4B is a perspective view of a portion of the rotatable top according to an embodiment of the invention.
Figure 4C:
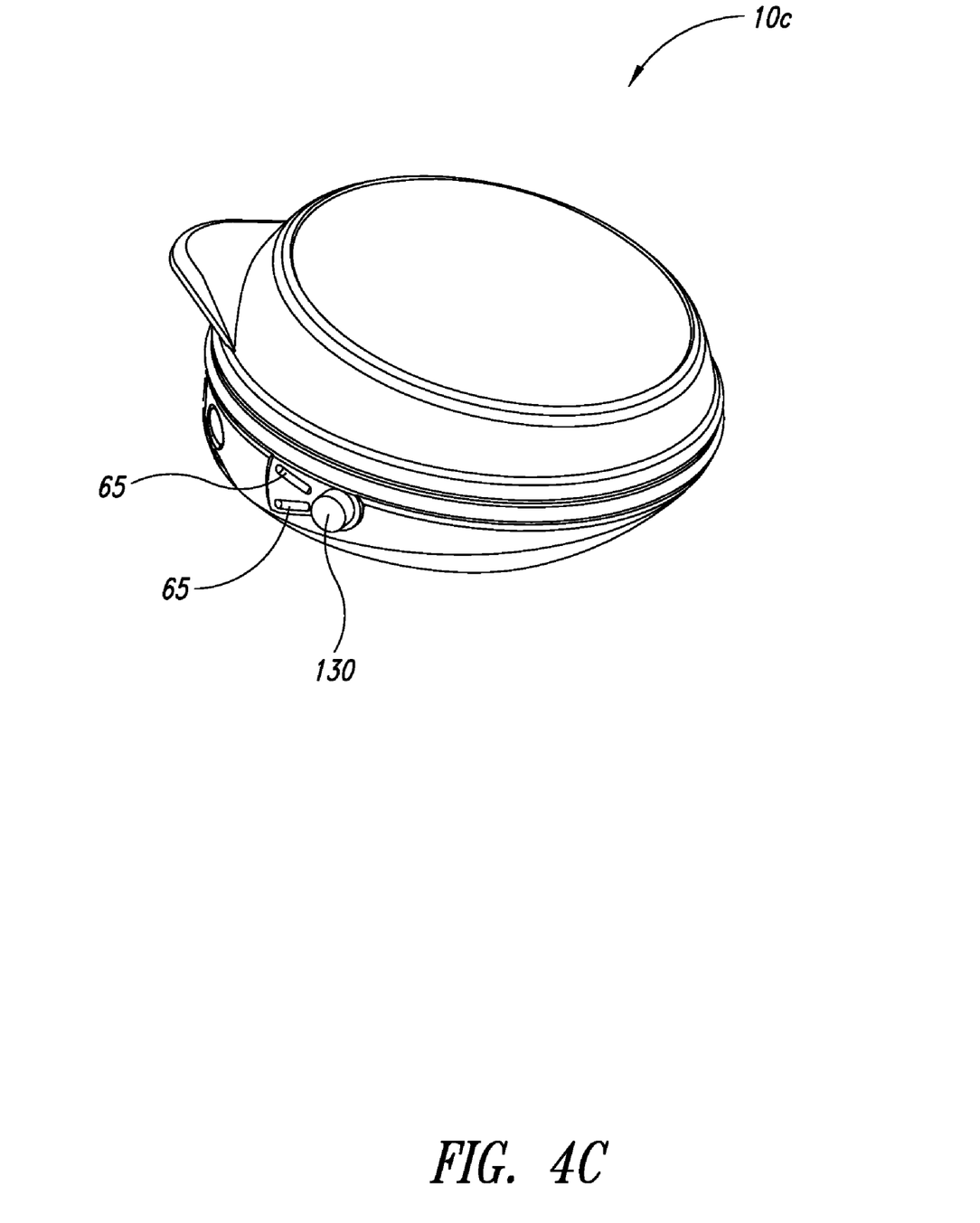
FIG. 4C is a perspective view of a portion of the rotatable top according to an embodiment of the invention.

Referring to FIGS. 4A-4C, portions of the rotatable top 10 are shown. In FIG. 4A, a portion of the rotatable top 10a has a rotatable portion 35a rotatably coupled to a stationary portion 10b. The rotatable portion 35a is rotatably coupled to the stationary portion 10b at receiving members 120 that define a rotation axis 125 such that the rotatable portion 35a rotates about the rotation axis 125 at the receiving members 120. The rotatable portion 35a may be coupled to the stationary portion 10b by any coupling device that secures the rotatable portion 35a to the stationary portion 10b and allows the rotatable portion 35a to rotate about the rotation axis 125. For example, the rotatable portion 35a may be coupled to the stationary portion 10b by pins 130 that extend radially from a lid 10c of the rotatable portion 35 into receiving members 120 in the stationary portion 10b. Other coupling mechanisms are well known to those of ordinary skill in the art, such as a ball and socket or a biased latch or protruding rib that engages receiving members 120 or other receiving portions configured to secure the rotatable portion 35a to the stationary portion 10b. The stationary portion 10b also has the container gasket 15 around an outside perimeter of its bottom portion and an upper gasket 70 around its upper portion where the lid 10c of the rotatable top 10 is coupled to the rotatable portion 35a. The upper gasket 70 is configured to substantially prevent liquid from leaking out from between the lid 10c and stationary portion 10b of the rotatable top 10.

Figure 5:
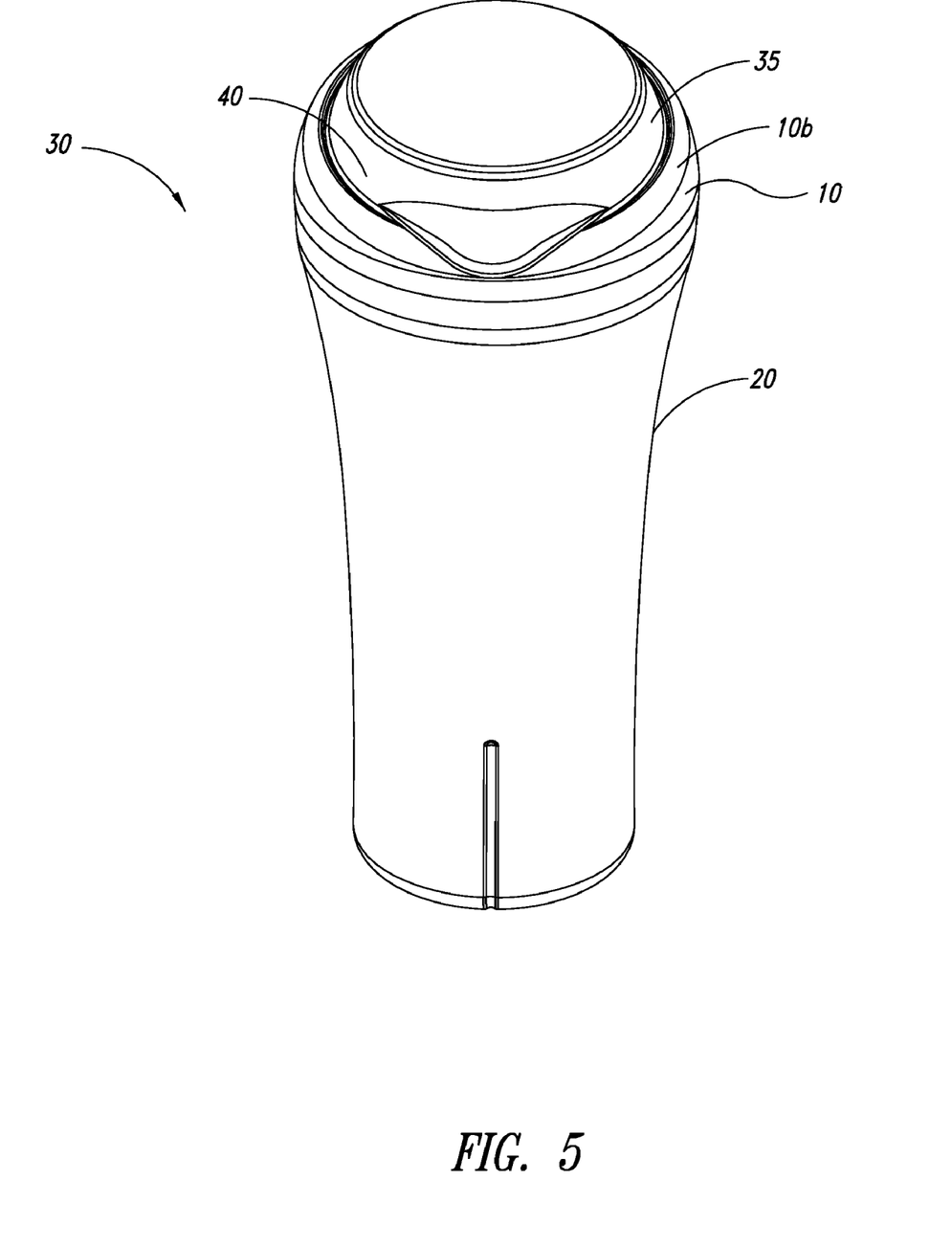
FIG. 5 is a perspective view of the beverage maker with the rotatable top in a closed position according to an embodiment of the invention.
Figure 9:
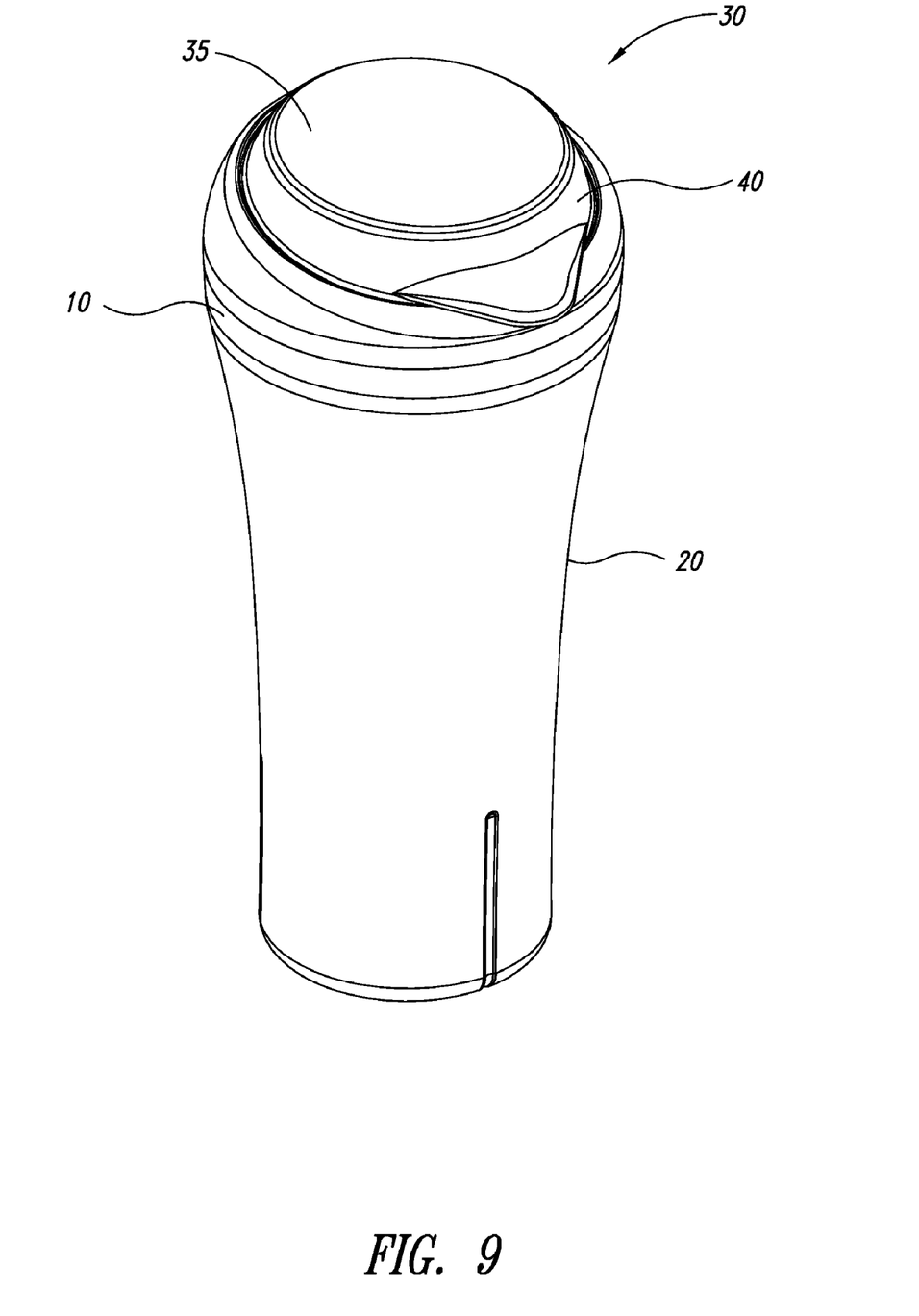
FIG. 9 is a perspective view of the beverage maker with the rotatable top in a closed position according to an embodiment of the invention.

Any gasket material suitable for use with a beverage container may be used as upper gasket 70. In alternative embodiments, the lid 10c of the rotatable top 10 is coupled to the rotatable portion 35a such that the upper gasket 70 is not necessary. For example, lid 10c may be substantially permanently coupled to or configured as a unitary seal with the rotatable portion 35a, thereby preventing leakage without a gasket. Various positions of the rotatable top 10 will now be described in reference to FIGS. 5-12. The rotatable top 10 is removably coupled to the container 20 forming the cocktail mixer 30. In FIGS. 5 and 9, the rotatable top 10 is shown in a closed position 40 with the rotatable portion 35 removably secured against the stationary portion 10b of the rotatable top 10. In the closed position 40, the cocktail mixer 30 is substantially sealed and will hold liquid inside while a user shakes or mixes a beverage within the cocktail mixer 30 without a significant amount of liquid escaping.

Figure 6:
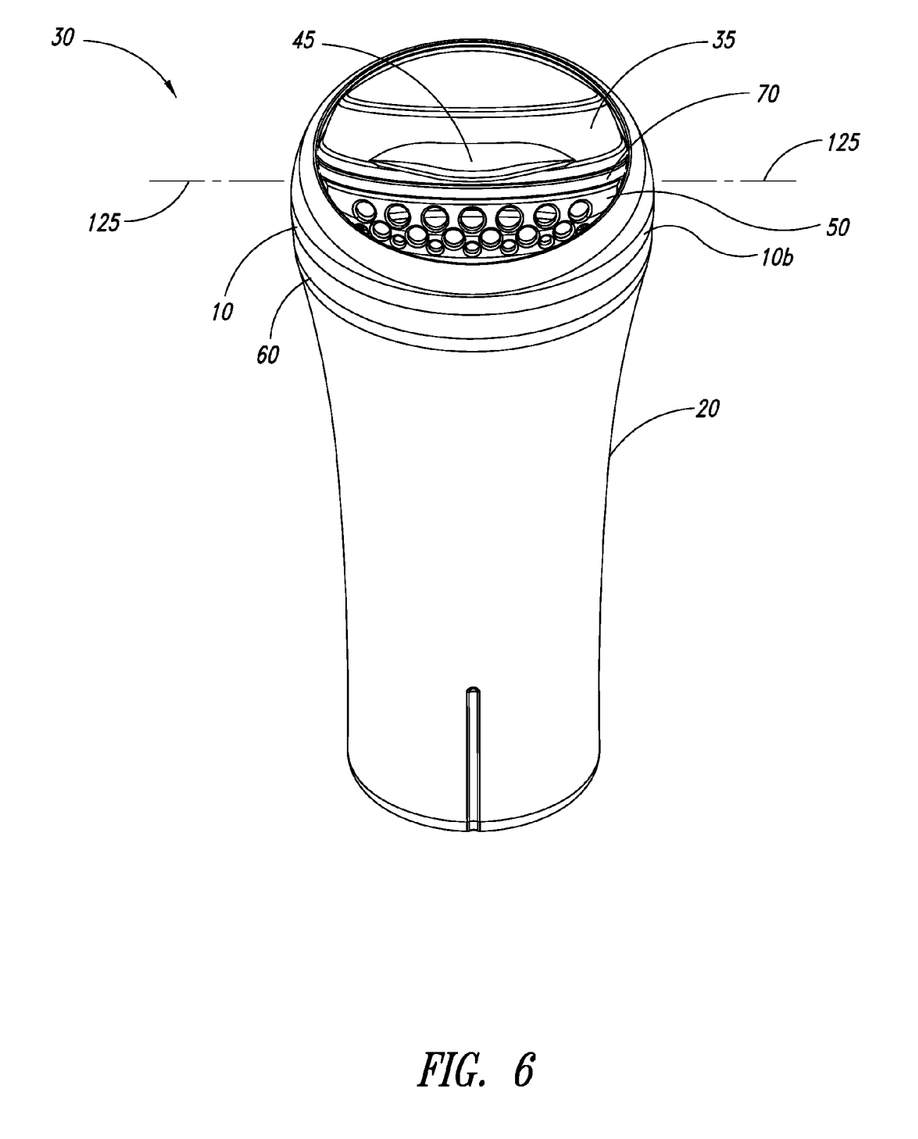
FIG. 6 is a perspective view of the beverage maker with the rotatable top in a dispensing or straining position according to an embodiment of the invention.
Figure 10:
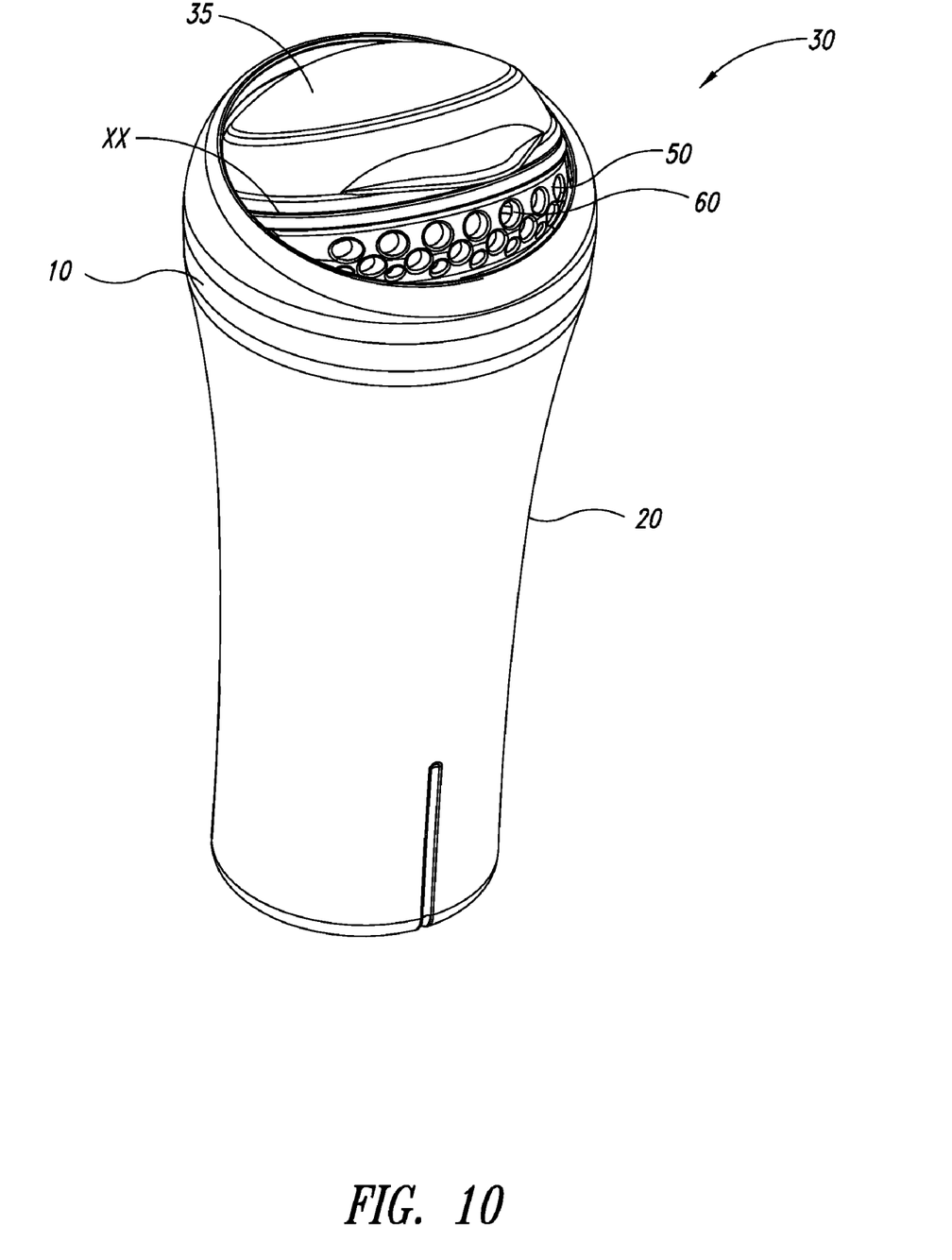
FIG. 10 is a perspective view of the beverage maker with the rotatable top in a dispensing or straining position according to an embodiment of the invention.

In FIGS. 6 and 10, the rotatable top 10 is shown in a straining position 50 with the rotatable portion 35 rotated upwards by a user by pressing upwards on lip 45 to reveal perforated area 60 between the stationary portion 10b of the rotatable top 10 and the upper gasket 70 of the rotatable portion 35. The straining position 50 is provided by simply rotating the rotatable portion 35 about the rotation axis 125 to expose the perforations in the perforated area 60. A stop mechanism comprising stationary stop lip 55 and rotating stop lips 65 (shown in FIGS. 4B and 4C) holds the rotatable top 10 in the straining position 50 such that a lower portion of the perforated area 60 is at or below an upper portion of the stationary portion 10b, allowing a drink mixed in the cocktail mixer 30 to be dispensed through the perforated area 60 without substantial leakage between the lower portion of the perforated area 60 and the upper portion of the stationary portion 10b of the top. The stop mechanism holds the rotatable top 10 in the straining position 50 when the stationary stop lip 55 is pushed between the rotating stop lips 65 (shown in FIGS. 4B and 4C), such that an applied force by a user is necessary to move the rotatable top 10 out of the straining position 50. In alternative embodiments, multiple rotating stop lips 65 can be used to provide a desired stop resistance at many desired rotational positions for the rotatable lid 10 along its rotation axis. Any suitable mechanism may be used in place of the stationary stop lip 55 and rotating stop lips 65 for holding the rotatable top 10 in the straining position 50, or to hold the rotating top 10 in any desired rotated position. In alternative embodiments, the stop mechanism is configured to allow a user to apply enough force by hand to move the rotatable top 10 into its various rotated positions while the stop mechanism supplies enough resistance to prevent the rotatable top 10 from moving out of position without that user's force. Alternative stop mechanisms can include a rib and groove disposed about portions of the peripherals of the rotatable top 10 configured to engage stationary portions of the lid 10c or container 20. The straining position 50 and perforated area 60 are configured such that when pouring a mixed drink out of the cocktail mixer 30, liquid can pass through the perforated area 60 but solids, such as ice, cannot substantially pass through. In alternative embodiments, the perforated area 60 may be configured with multiple holes of different sizes. For example, in one position the top rows of the perforated area 60 may be smaller to substantially only allow liquid to pass through, while lower rows of the perforated area 60 may be bigger to allow smaller to larger pieces of ice or other solids to pass through. In other embodiments, the perforations may be any desired shape or size.

Figure 7:
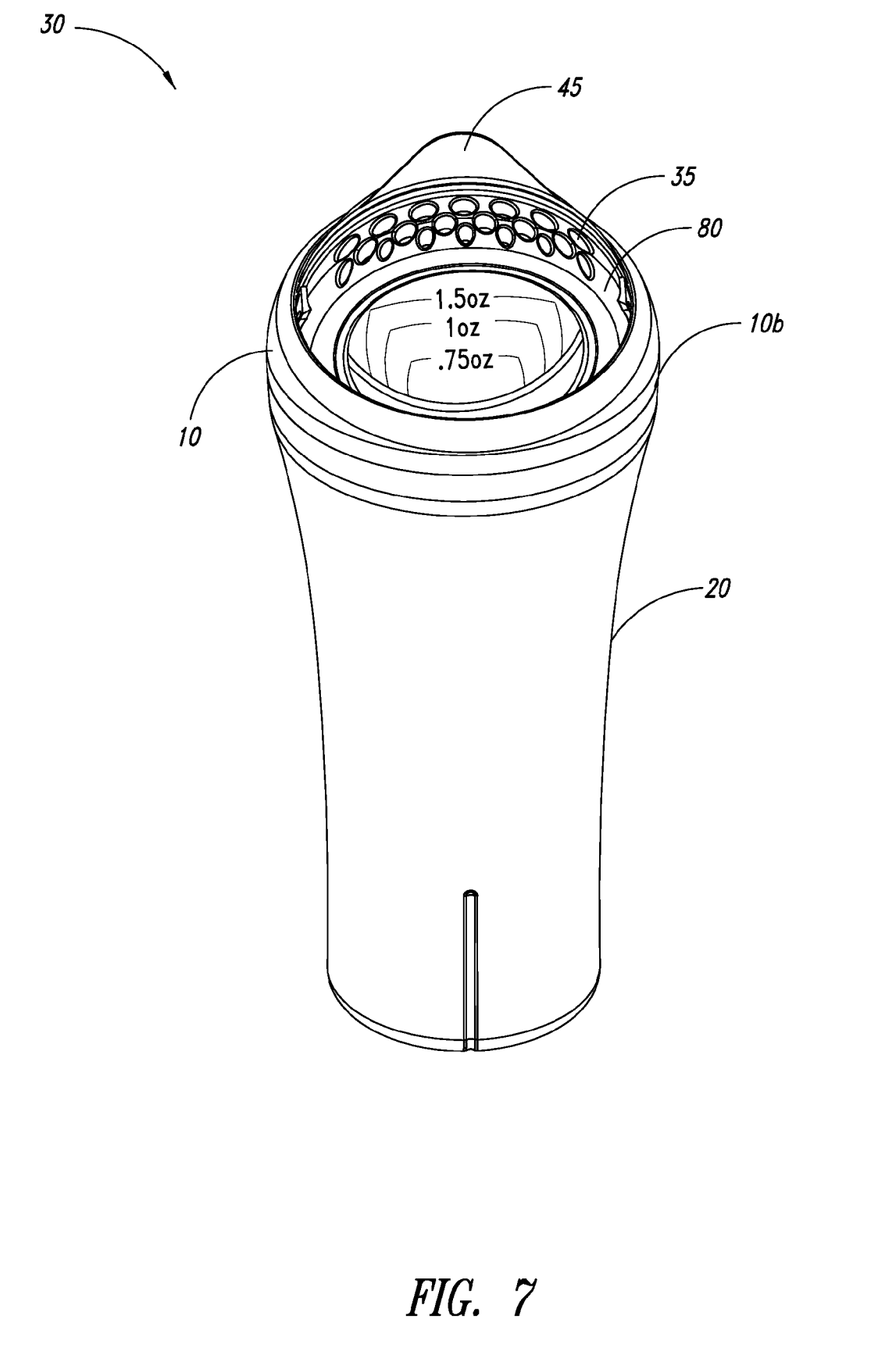
FIG. 7 is a perspective view of the beverage maker with the rotatable top in an open position according to an embodiment of the invention.
Figure 11:
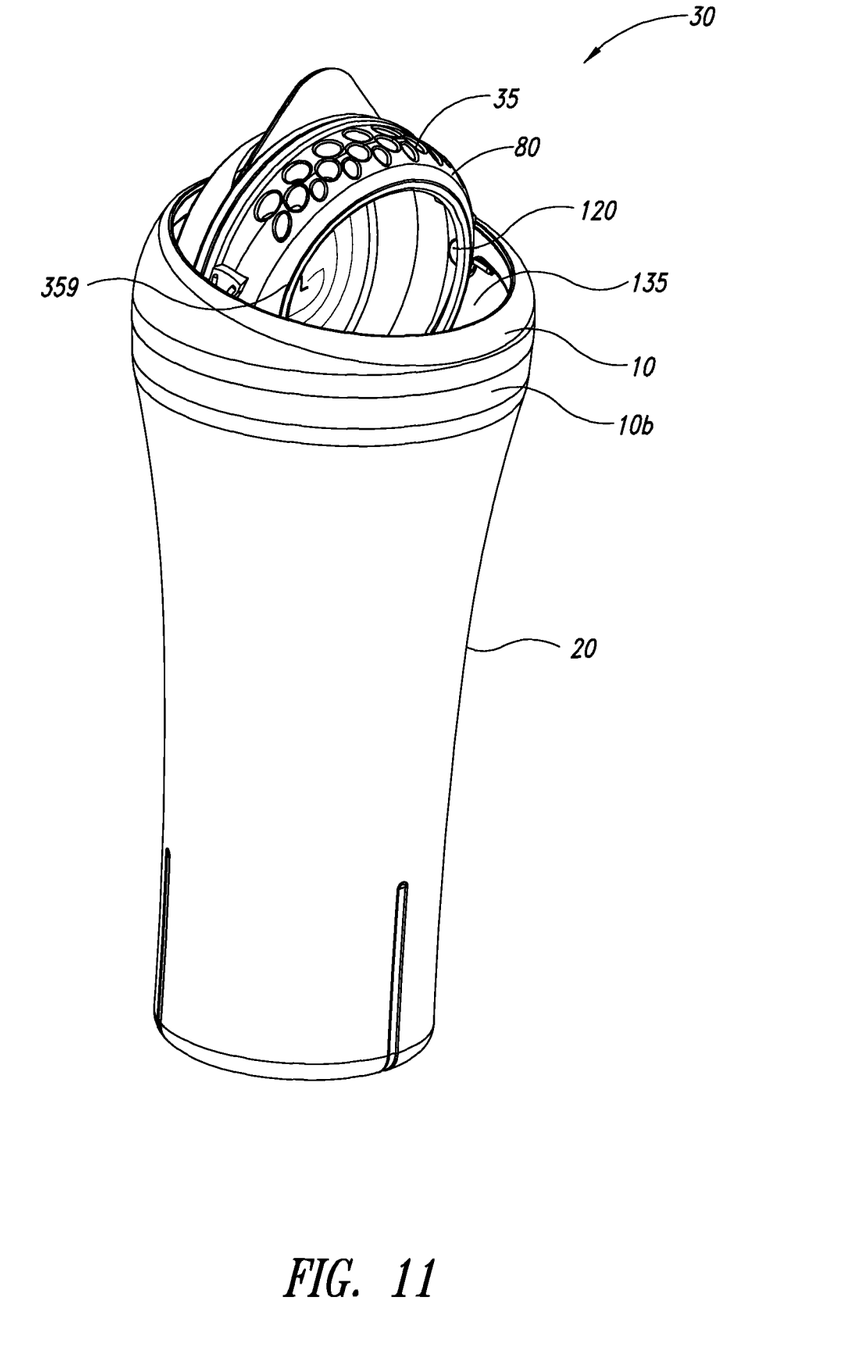
FIG. 11 is a perspective view of the beverage maker with the rotatable top in an open position according to an embodiment of the invention.

In FIGS. 7 and 11, the rotatable top 10 is shown in an open position 80, which is accomplished by a user applying a force to the lip 45 and moving the rotatable top 10 out of the straining position 50, thereby moving the bottom rotating stop lip 65 past the stationary stop lip 55 (shown in FIGS. 4B and 4C). In this position, a beverage may be poured out of the cocktail mixer 30 without straining through an open space 135 between the rotatable portion 35 and the stationary portion 10b of the top. Liquids and solids may also be inserted and poured directly into the container 20 of the cocktail mixer 30 in the open position 80 through the open space 135. Liquids and solids may also be poured into the measuring well 100 in the open position 80.

Figure 8:
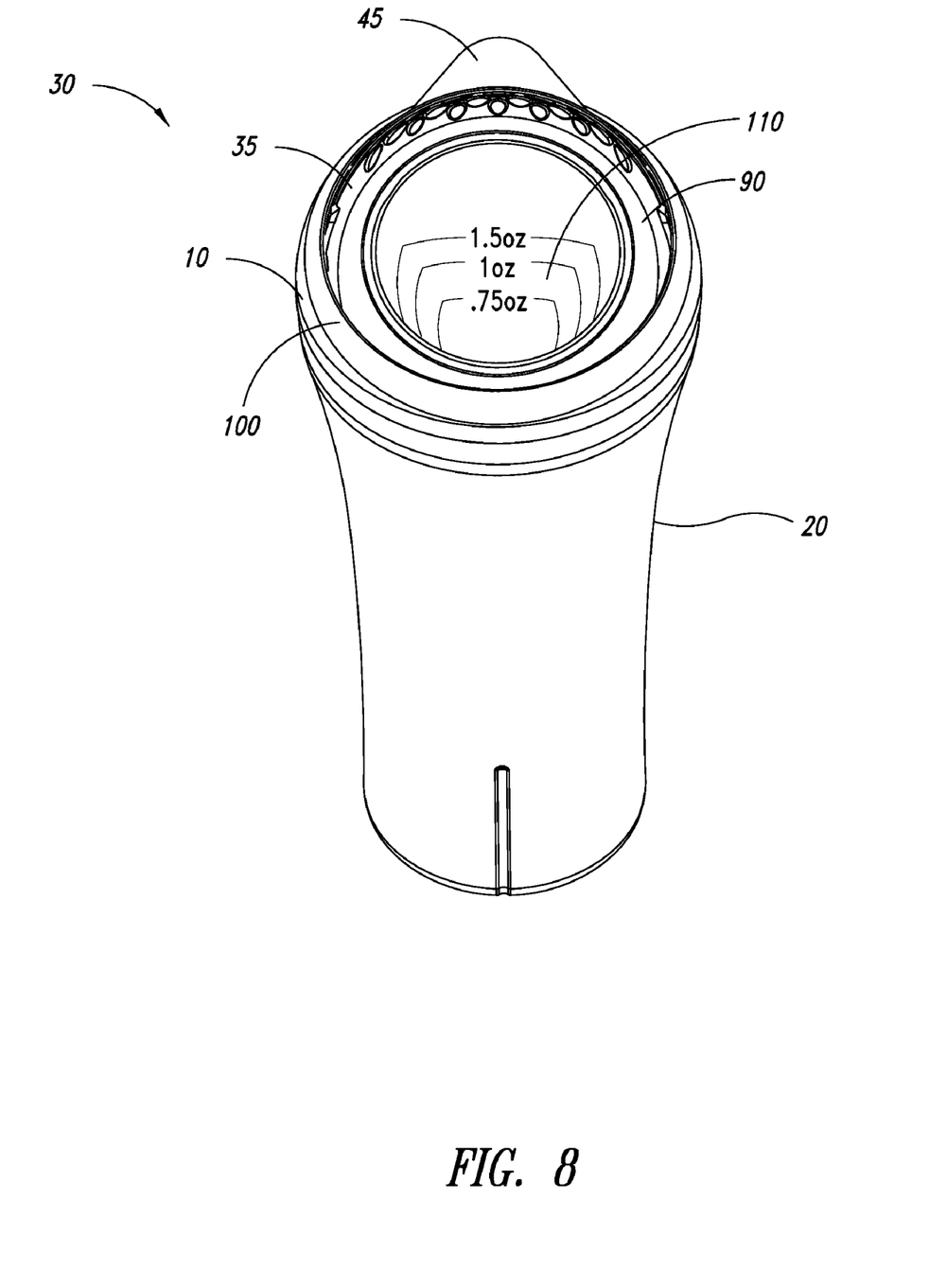
FIG. 8 is a perspective view of the beverage maker with the rotatable top in a measuring position according to an embodiment of the invention.
Figure 12:
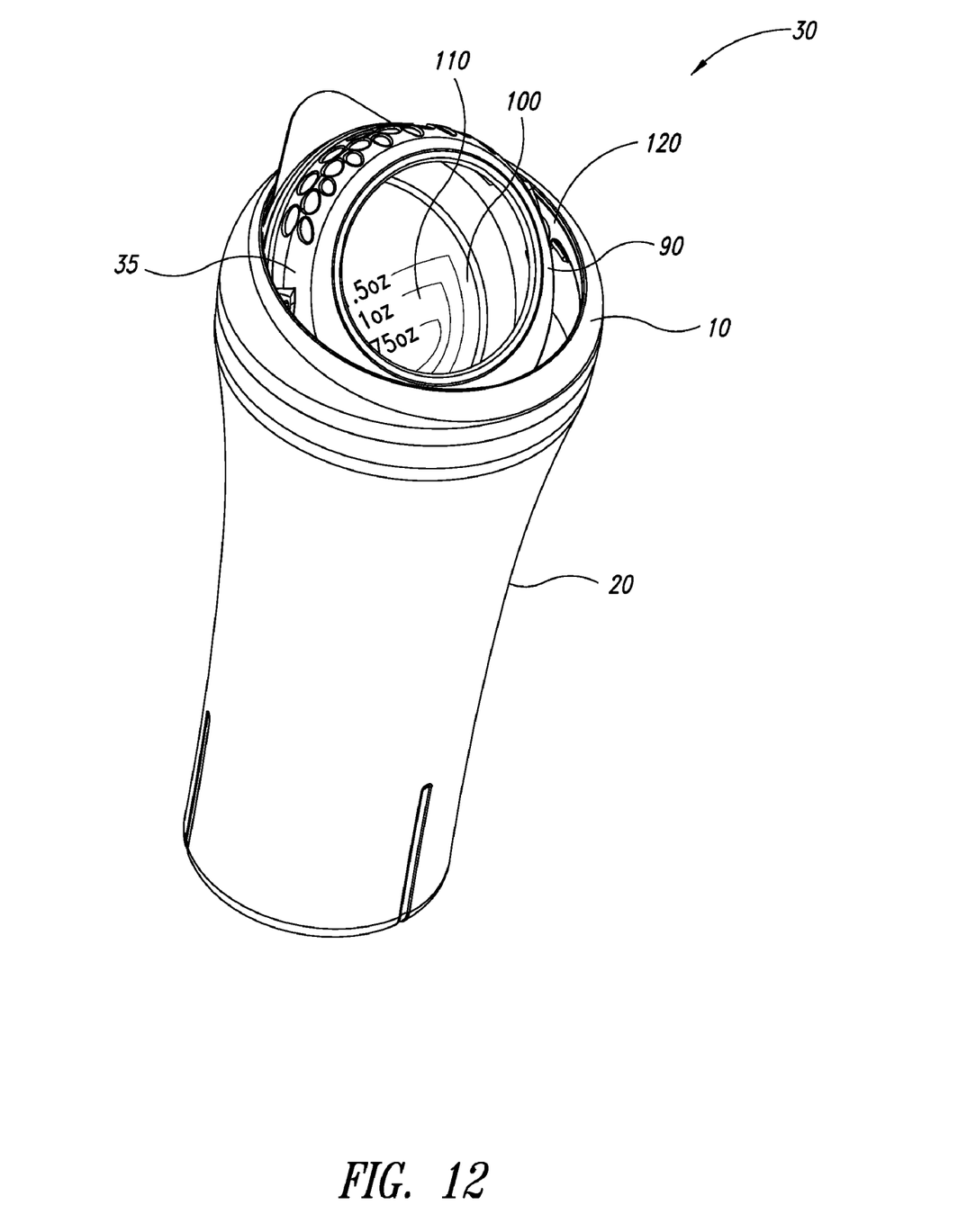
FIG. 12 is a perspective view of the beverage maker with the rotatable top in a measuring position according to an embodiment of the invention.

In FIGS. 8 and 12, the rotatable top 10 is shown in a measuring position 90, which is accomplished by a user applying a force to the lip 45 and moving the rotatable top 10 out of the open position 80. In this position, a user may pour various liquids or other materials into a measuring well 100. Measuring indicia 110 within the measuring well 100 allow the user to measure a volume of liquid poured into the measuring well 100. Once a desired amount of liquid is within the measuring well 100, the user may pour the liquid into the container 20 by moving the rotatable top 10 back into the closed position 40, or a position close to the closed position 40, such that the liquid drops from the measuring well 100 into the container 20. The measuring well 100 may be used to measure any suitable liquid, solid or other material for pouring or mixing within the container 20. In embodiments, as shown in FIGS. 8 and 12 for example, the measuring position 90, measuring well 100 and measuring indicia 110 are configured to provide a precise angled measuring system where the well 100 and indicia 110 are at an angle to provide ease of viewing and measurement by a user measuring ingredients for a mixed drink. In alternative embodiments, the measuring indicia 110 may be configured to measure volume of a liquid or solid or other desirable measurements. In other embodiments, the measuring well 100 does not have measuring indicia 110 but instead, for example, may be a pre-defined volume.

A user may use the measuring well 100 multiple times to make a drink, for example, to measure several different liquids and/or solids for a desired cocktail. These liquids may include alcohol, spirits, liquors, juices, flavorings, and water, among other desired liquids, and the solids may include ice, spices, plant matter, fruit, vegetables, flavorings, or any other desired solid. The user may use the measuring well 100 to separately measure various liquids, each time rotating the rotatable top 10 to the measuring position 90 and pouring the measured liquid into the container 20 by rotating the rotatable top 10 into the closed position 40. During, before, or after using the measuring position 90, the user may also insert various other liquids, solids or other materials, such as ice, into the container 20 by rotating the rotatable top 10 into the open position 80 and inserting the liquids, solids or other materials directly into the container 20 through an open space 135 (FIG. 11) between the rotatable portion 35a and the stationary portion 10b of the rotatable top 10. After all of the desired ingredients are within the container 20, the user may rotate the rotatable top 10 into the closed position 40 and proceed to mix or shake the container's 20 contents. Then, the user may rotate the rotatable top 10 into the straining position 50 and dispense the mixed drink through the perforations 60. Additionally, or in the alternative, the user may rotate the rotatable top 10 into the open position 80 and dispense the mixed drink through the open space 135, which may dispense other materials in the container besides liquid, such as ice.

The various embodiments described above can be combined to provide further embodiments. Aspects of the embodiments can be modified, if necessary to employ the inventive concepts and to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A cocktail mixer, comprising:
 a container having a body generally oriented about an axis of rotation, the container being sized and shaped to be manually shaken by a user, and a cover adapted to be sealingly coupled to the body, the cover comprising:
 an outer portion adapted for sealed, removable engagement with the body of the container, the outer portion of the cover having a central opening therethrough; and
 a hollow measuring chamber having a first portion with an opening therein for receiving a liquid, a second portion having no opening therein to enable the measuring chamber to hold the liquid, and a third portion, between the first portion and the second portion, having a plurality of straining elements therein, the measuring chamber being adapted to receive and retain a volume of the liquid when the first portion is oriented above the central opening, to pour the liquid into the body of the container when the second portion is above the central opening, and to strain liquid when the third portion is above the central opening; wherein
 a pin-type connector rotatably couples opposing points on the measuring chamber to the outer portion of the cover, allowing a user to rotate the measuring chamber with respect to the container and the outer portion of the cover about a pivoting axis non-parallel with respect to the axis of rotation of the body, the measuring chamber being pivotable between at least a measuring orientation in which the first portion of the measuring chamber is oriented above the central opening, a mixing orientation in which the second portion of the measuring chamber is above the central opening, and a straining orientation in which the third portion of the measuring chamber is above the central opening.

2. The cocktail mixer of claim 1 wherein the container comprises a distal end and proximal end, the distal end being closed and the proximal end being open, and wherein the cover is coupleable to the proximal end.

3. The cocktail mixer of claim 1 wherein the pivoting axis substantially perpendicular to the axis of rotation.

4. The cocktail mixer of claim 1 wherein the cocktail mixer is completely sealed when the measuring chamber is in the mixing orientation.

5. A cover for a cocktail mixing container sized and shaped to be manually shaken by a user, the cover comprising a central opening therethrough and a rotatable receptacle permanently positioned at least partially within the central opening, the receptacle having an opening in one end thereof such that the receptacle can be filled with a liquid when the opening is above the central opening and can pour the liquid into the container when the opening is below the central opening, the receptacle having a plurality of straining elements therein positioned adjacent the opening, the receptacle being pivotably coupled to the cover to rotate with respect to the cover between measuring, mixing and straining orientations, the receptacle being pivotably coupled to the cover at substantially opposing locations on the receptacle such that the receptacle remains at least partially within the central opening during its entire rotation, the receptacle being oriented with the opening above the central opening when the cover is in the measuring configuration; the receptacle being oriented with the opening below the central opening when the cover is in the mixing configuration; and the receptacle being oriented with the straining element above the central opening when the cover is in the straining configuration.

6. The cover of claim 5 wherein the receptacle comprises a measuring well configured to measure volume when the rotatable top is in a measuring configuration.

7. The cover of claim 5 wherein the straining element comprise perforations.

8. The cover of claim 5, further comprising means for holding the receptacle in the measuring, mixing, and straining configurations.

9. The cover of claim 8 wherein the means for holding the receptacle in the measuring, mixing, and straining configurations comprises a stop mechanism comprising one or more stationary stop lips and one or more stop lips.

\* \* \* \* \*